Sept. 14, 1943.    G. C. PEARCE    2,329,417
DOMESTIC APPLIANCE
Filed Aug. 23, 1940
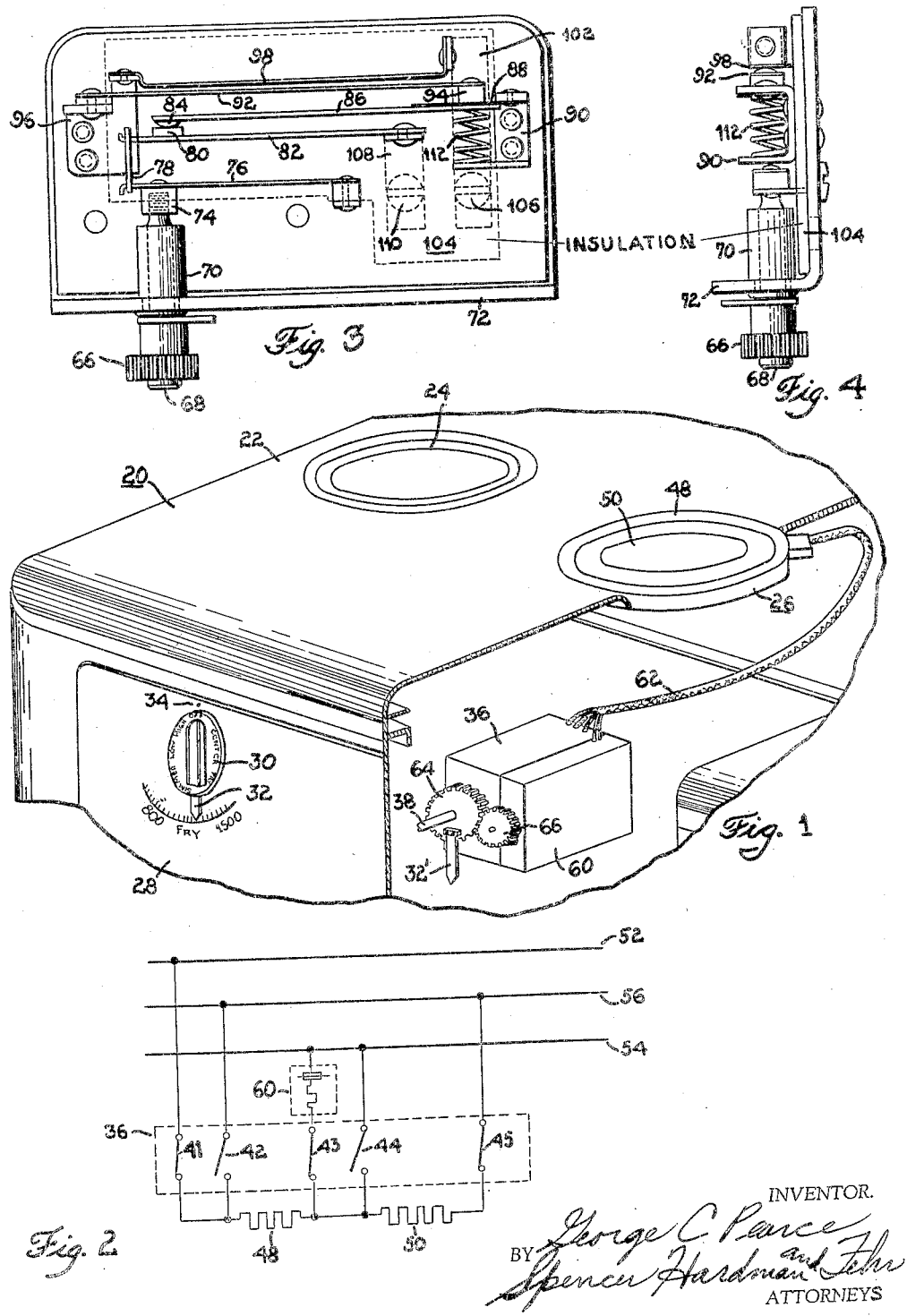

Patented Sept. 14, 1943

2,329,417

UNITED STATES PATENT OFFICE 2,329,417

DOMESTIC APPLIANCE

George C. Pearce, Dayton, Ohio, assignor to General Motors Corporation, Dayton, Ohio, a corporation of Delaware Application August 23, 1940, Serial No. 353,885

19 Claims. (Cl. 219—20)

This invention relates to a domestic appliance and more particularly to means for controlling the heating effect of electric surface heaters.

There are several systems of controlling the heating rates of surface heaters. In one system, the surface heater is controlled throughout its range by adjustable pulsating or vibrating contacts which produce an average temperature of the heater according to the adjustment of the contacts. In another system, the surface heater is divided into several elements and these elements may be connected continuously to the power source in various circuit arrangements to produce various constant heating rates.

Each of these systems has objectionable features. In the pulsating system, accurate thermostatic calibration is difficult to obtain at the two ends of the range of operation of the heater control. Also, this system has no fixed heats so that the switch means cannot be set directly to any single easily located position, but a thermostatic setting must be used for each heating rate desired. Also, the pulsating contacts must operate for any desired heat range, even those which are used for cooking foods for long periods of time. Under such conditions the life of the contacts is comparatively short and replacements are necessary frequently.

In the other system mentioned, for fat frying, meat frying and griddle work, it is often necessary to switch from one position to another rather frequently in order to obtain just the right average temperature conditions desired for such cooking purposes.

It is an object of my invention to provide a control system for a surface heater which overcomes the objectionable features or each of these systems and incorporates the desirable features of these systems.

It is another object of my invention to provide a control system for a surface heater which provides fixed heats for low temperature slow cooking and accurately adjustable average temperatures for high temperature rapid cooking.

It is another object of my invention to provide a control system for a surface heater which provides a plurality of fixed heats of comparatively low rates and a fixed high heat, together with an adjustable pulsating contact control operating mainly in the range between the lower fixed heats and the fixed high heat.

It is a further object of my invention to provide an improved thermostatically controlled pulsating contact device controlling the output of surface heaters of electric ranges.

It is still another object of my invention to provide a control system in which the electric surface heater is alternated between a plurality of different energized heating rates.

Further objects and advantages of the present invention will be apparent from the following description, reference being had to the accompanying drawing, wherein a preferred form of the present invention is clearly shown.

In the drawing:

Fig. 1 is a perspective view of a portion of an electric range showing a plurality of surface heaters embodying one form of my invention;

Fig. 2 is a wiring diagram for one of the surface heaters shown in Fig. 1;

Fig. 3 is a view in elevation of the interior of the pulsating contact control shown in Fig. 1; and Fig. 4 is an end view of the pulsating contact control shown in Fig. 3.

Briefly, I have shown an electric range having a plurality of surface heaters each controlled by a switch means having five energized positions and an "off" position. In one of the energized positions, a pulsating electro-thermal contact device alternately connects two elements of the surface heater in series and individually to the power source to regulate the heat output of the surface heater within a limited range.

Referring now to the drawing and more particularly to Fig. 1, there is shown an electric range 20 provided with a range top 22 containing electric surface heaters 24 and 26, each formed of inner and outer heating elements. Each of the elements of the surface units 24 and 26 are connected by electrical conductors to similar controls. The surface heating unit 26 shows the portion of the control behind the front wall 28 of the range 20 while the surface heating unit 24 is connected to a similar control which has only the exterior portions visible. The exterior portions of the control for the surface heater 24 include an operating knob 30 provided with an "off" position and five energized positions "high," "low," "simmer," "center" and "fry." Below this knob 30 is the scale labeled "fry" and marked 800 and 1500. A pointer 32 beneath the knob 30 and movable independently of the knob 30 cooperates with the scale labeled "fry." This pointer 32 is only effective when the knob 30 is in the "fry" position. A small dot cooperates with the knob 32 to indicate the effective position of the knob.

The portion of the control behind the front wall 28 is exactly the same as the corresponding portion of the control for the surface heater 26. This includes a switch box 36 provided with a knob shaft 38 upon which a knob identical to the knob 30 is normally mounted. By this switch mechanism 36 I am able to obtain four different fixed heats and a variable heat. This switch mechanism 36 includes the switch contacts 41, 42, 43, 44 and 45. The positions of these contacts and the typical heat output in each position is designated in the following table:

| Heat arrangement | Watts input | Switch 41 | Switch 42 | Switch 43 | Switch 44 | Switch 45 |
| --- | --- | --- | --- | --- | --- | --- |
| High | 2000 | Closed | 0 | 0 | 0 | Closed |
| Fry | 800–1500 | Closed | 0 | Closed | 0 | Closed |
| Center | 600 | 0 | 0 | Closed | Closed | 0 |
| Low | 350 | 0 | Closed | 0 | Closed | Closed |
| Simmer | 220 | Closed | 0 | 0 | 0 | Closed |

These switch mechanisms connect the outer heating element 48 and the inner heating element 50 of the heater 26 to the standard 3-wire Edison supply source including outside conductors 52 and 54 and the inner or neutral conductor 56. This source provides 230 volts across the outside conductors and 115 volts across either of the outside conductors and the neutral conductors.

I have found that the fixed heat positions provided by "high," "center," "low" and "simmer" in such an arrangement are excellent for rapid preheating and low temperature slow cooking; but such fixed heats are not altogether satisfactory for medium temperature cooking such as deep fat frying, meat frying and griddle work. Heretofore it has been necessary to alternate the knob 30 between "high" and "medium" or medium and center positions of the knob in order to obtain the desired heat rate from the surface heaters for such cooking. In order to avoid this I have provided the pulsating contact means 60 which is mounted upon the side of the switch mechanism 30 and connected along with the switch mechanism 36 by electrical conductors 62 to the surface heating unit 26.

This pulsating contact mechanism 60 is shown diagrammatically in Fig. 2 connected in circuit between the switch 43 and the conductor 54. Fig. 2 shows the switch mechanism 36 in the "fry" position wherein the switches 41, 43 and 45 are closed. When the pulsating contact mechanism 60 is in the open position, the heating elements 48 and 50 are connected across the conductor 52 and the neutral conductor 56 providing a "simmer" connection. However, when the pulsating contact mechanism is in the closed position, the outer element 48 is connected across the outside conductors 52 and 54 and the inner element 50 is connected across the outside conductor 54 and the neutral conductor 56 to obtain its full output. Thus the pulsating contact mechanism 60 alternates between the "high" and the "simmer" heats to provide an average heating rate in between these two heating rates.

I find it desirable to limit the adjustment of this pulsating or vibrating contact mechanism to the condition in which the contacts are closed more than 25% of the time and less than 75% of the time. However, in order to place the range of heating above the output in the "center" position, I prefer to limit the range to conditions in which the contacts are closed between 32.5% and 75% of the time to provide a range of from 800 to 1500 watts in which any desirable heating rate may be obtained.

In order to operate the adjusting means, I provide a gear wheel 64 loosely mounted upon the knob shaft 38 and meshed with the pinion 66 mounted upon the adjusting shaft of the pulsating contact mechanism 60. The gear wheel 64 has a pointer 32' fastened to it which corresponds to the pointer 32 beneath the knob 30. In this way, I have provided a convenient adjusting arrangement for controlling the switch mechanism 36 as well as the pulsating mechanism contact 60.

The pinion 66 is mounted upon the shaft 68 which is rotatably mounted in a bearing 70 supported by the metal frame 72 of the pulsating contact mechanism. This shaft 68 terminates in a threaded end which is threaded into a cup-shaped member 74 riveted to a spring arm 76. This spring arm 76 is connected by an insulating link 78 to a normally stationary contact member 80 mounted upon the spring arm 82 which is anchored to the terminal member 108 provided with a binding screw 110 connected to the outside conductor 54. The arm 82 is tensioned so as to keep a tension upon the insulating link 78. The rotation of the pinion 66 through this means moves the normally stationary contact 80 back and forth in order to make the desired adjustments of the pulsating contact mechanism.

Cooperating with the normally stationary contact 80 is the movable contact 84 which is mounted upon the end of the pivot arm 86, pivoted by means of a spring hinge 88 to the bracket 90. The movable contact 84 is operated by a thermostatic strip 92 which extends from the post 94 upon the pivot arm 86 adjacent the spring hinge 88 to an anchoring member 96 which is fastened to the base 72. A compression type coil spring 112 constantly urges the pivot arm 86 in a clockwise direction to keep a tension upon the strip 92. This thermostatic strip 92 is heated by ribbon-type heater 98 which is connected in series with the contacts 80 and 84 and extends between the anchoring member 96 and a terminal member 102 which is mounted upon insulated portion 104 of the base 72. This terminal member 102 is provided with a binding screw 106 for connection with the switch 43. The thermostatic strip 92 is substantially compensated for changes in ambient temperature by its connection at its opposite ends through brackets to the base 72 which is similarly affected by ambient temperature.

By this arrangement when the knob is moved to the "fry" position (preferably after preheating in the "high" heat position) and the switches 41, 43 and 45 are closed as shown in Fig. 2, current will go through the ribbon heater 98 and through the contacts 84 and 80 to supply energy to both heater elements 48 and 50 in the "high" heat circuit arrangement. The contacts will be opened after a short interval by the heating effect of the current carrying heater 98 on the thermostatic strip 92. This heating effect will cause the thermostatic strip 92 to lengthen and the coil spring 112 will keep the thermostatic strip 92 in a stretched position and pivot the contact arm 86 in a clockwise direction to separate the contacts 84 and 80. This will deenergize the heater 98 and open the connection to the outside conductor 54 thus connecting the elements 48 and 50 in series across the outside conductor 52 and the neutral conductor 56 in the "simmer" heat circuit arrangement. The thermostatic strip 92 and the heater 98 will cool thus allowing the strip 92 to contract and close the contacts 84 and 88 thus returning the elements 48 and 50 to the parallel "high" heat circuit arrangement.

The proportion of the time the contacts 84 and 88 are in the closed position will determine the heat output of the surface heating units in the "fry" position. The movement by the pointer 32' of the contact 88 toward or away from the contact 84 will increase or decrease the average length of time the contacts are closed in order to increase or decrease the heat output of the surface heater.

Thus, by this arrangement I obtain the combined advantages of the two systems and eliminate their disadvantages. Obviously, other forms of pulsating contact mechanisms, such as an adjustable motor-driven cam arrangement, might be used in the place of the one specifically described.

While the form of embodiment of the invention as herein disclosed, constitutes a preferred form, it it to be understood that other forms might be adopted, all coming within the scope of the claims which follow.

What is claimed is as follows:

1. An electric surface heating means comprising a surface heater having a plurality of heating sections, means for supplying electric energy to the heater, and means responsive to the flow of electric energy for repeatedly rapidly alternately connecting in one alternate connection the elements individually to the supply means and in the other alternate connection in series circuit relationship to the supply means to control the heating effect.

2. An electric surface heating means comprising a surface heater having a plurality of heating sections, means for supplying electric energy to the heater, and vibrating means responsive to the flow of electric energy for repeatedly rapidly alternately connecting in one alternate connection the elements individually to the supply means and in the other alternate connection in series circuit relationship to the supply means to control the heating effect.

3. An electric surface heating means comprising a surface heater having a plurality of heating sections, means for supplying electric energy to the heater, and temperature responsive means responsive to the flow of electric energy for repeatedly rapidly alternately connecting in one alternate connection the elements individually to the supply means and in the other alternate connection in series circuit relationship to the supply means to control the heating effect.

4. An electric surface heating means comprising a surface heater having a plurality of heating sections, means for supplying electric energy to the heating sections, a single control manually settable multiple position switch means having a plurality of operating positions for connecting said heating sections in various circuit arrangements to said source to provide various fixed constant heating rates, said switch means including one position in which all sections are energized constantly at their highest heating rate and a plurality of other positions providing fixed constant energization at lesser heating rates, said switch means having still another position, means effective only in said still another position for repeatedly alternately energizing said heater at different rates, and means for varying the frequency of the alternations.

5. An electric heating means comprising an electric surface heater having a plurality of heating sections, a three-wire Edison type power source having a relatively high voltage across two of said wires as compared with that across either of said two wires and the third wire, and means for repeatedly rapidly alternately connecting in one alternate connection a plurality of said sections in series across one of said two wires and the third wire and in the other alternate connection connecting one of the sections across said two wires and the other across one of said two wires and the third wire.

6. An electric heating means comprising an electric surface heater having two heating sections, a three-wire Edison type power source having a relatively high voltage across two of said wires as compared with that across either of said two wires and the third wire, switch means for connecting a terminal of one of said sections to one of said two wires a terminal of another section to said third wire, and means for repeatedly rapidly alternately connecting and disconnecting to and from the other of said two wires the other terminals of said one said another section for controlling the heating effect.

7. An electric heating means comprising an electric surface heater having two heating sections, a three-wire Edison type power source having a relatively high voltage across two of said wires as compared with that across either of said two wires and the third wire, switch means for connecting a terminal of one of said sections to one of said two wires and a terminal of the second section to said third wire, means for repeatedly rapidly alternately connecting and disconnecting to and from the other of said two wires the other terminals of said one and said second section for controlling the heating effect, and means for varying the frequency of the alternations.

8. An electric heating means comprising an electric surface heater having two heating sections, a three-wire Edison type power source having a relatively high voltage across two of said wires as compared with that across either of said two wires and the third wire, and means for repeatedly rapidly alternately connecting in one alternate connection said sections in series across one of said two wires and the third wire and in the other alternate connection connecting one of the sections across said two wires and the other across one of said two wires and the third wire, and manually settable multiple position connecting means having one position for rendering effective said alternately connecting means, having another position continuously connecting both sections in series to said source and having another position continuously connecting both sections individually to said source.

9. An electric heating means comprising an electric surface heater having two heating sections, a three-wire Edison type power source having a relatively high voltage across two of said wires as compared with that across either of said two wires and the thrid wire, means for repeatedly rapidly alternately connecting in one alternate connection said sections in series across one of said two wires and the third wire and in the other alternate connection connecting one of the sections across said two wires and the other across one of said two wires and the third wire, and manually settable multiple position connecting means having one position for rendering effective said alternately connecting means and other positions continuously connecting the heater to said source in various circuit arrangements to provide various constant heating rates.

10. An electric surface heating means comprising a surface heater having two heating sections, a source of electric energy, manually settable multiple position connecting means having a plurality of selective positions for continuously connecting said heater to said source of power in various circuit arrangements to obtain various constant heating rates, said manually settable means having still another selective position, means rendered effective only when said settable means is in said another position for repeatedly rapidly alternately connecting and disconnecting a terminal of said heater from said source at a relatively high frequency.

11. An electric surface heating means comprising a surface heater having two heating sections, a source of electric energy, manually settable multiple position connecting means having a plurality of selective positions for continuously connecting said heater to said source of power in various circuit arrangements to obtain various constant heating rates, said manually settable means having still another selective position, means rendered effective only when said settable means is in said another position for repeatedly rapidly alternately connecting and disconnecting a terminal of said heater from said source at a relatively high frequency, and means for varying the frequency of alternation.

12. An electric surface heating means comprising a surface heater having two heating sections, a source of electric energy, manually settable multiple position connecting means having a plurality of selective positions for continuously connecting said heater to said source of power in various circuit arrangements to obtain various constant heating rates, said manually settable means having still another selective position, means rendered effective only when said settable means is in said another position for repeatedly rapidly alternately connecting and disconnecting a terminal of said heater from said source at a relatively high frequency, said settable means in said still another position providing an average heating rate between the first and second highest constant heating rates.

13. An electric surface heating means comprising a surface heater having two heating sections, a source of supply of electric energy, a single control manually settable multiple position switch means having a plurality of operating positions for connecting said two heating sections in individual and series circuit arrangements to said source to provide various fixed constant heating rates, said switch means also having another position, and means effective only when said switch means is in said another position for repeatedly rapidly alternately connecting and disconnecting one terminal of one of said heating sections to and from said source.

14. An electric surface heating means comprising a surface heater having two heating sections, a source of supply of electric energy, a single control manually settable multiple position switch means having a plurality of operating positions for connecting said two heating sections in individual and series circuit arrangements to said source to provide various fixed constant heating rates, said switch means also having another position, and an intermittent type control effective only when said switch means is in said another position for repeatedly rapidly alternately connecting and disconnecting one terminal of one of said heating sections to and from said source.

15. An electric surface heating means comprising a surface heater having a plurality of heating sections, a source of supply of electric energy, a single control manually settable multiple position switch means having a plurality of operating positions for connecting said sections in series and individual circuit arrangements to provide several low and a high fixed constant heating rate for long slow cooking and preheating, said switch means also having another position, and an intermittent type control effective only when said switch means is in said another position for repeatedly rapidly alternately connecting and disconnecting one terminal of said heater to and from said source, and means for adjusting said control to provide a continuous range of heating rates above said several low fixed rates and below said high rate with the terminal connected on a total of between 25% and 75% of the time.

16. An electric surface heating means comprising a surface heater having a plurality of heating sections, a source of electric energy, manually settable multiple-position connecting means having a plurality of selective positions providing connections, certain of said connections continuously connecting said heater to said source of power in various circuit arrangements to obtain various fixed heating rates, said connecting means having one circuit connection in which one of the heating sections alone is connected to the source and another connection in which two heating sections are connected in series to said source, said manually settable means having at least one other position, means rendered effective when said connecting means is therein for repeatedly alternately connecting and disconnecting a terminal of said heater from said source at a relatively high frequency.

17. An electric surface heating means comprising a surface heater having a plurality of heating sections, a source of electric energy, manually settable multiple-position connecting means having a plurality of selective positions providing connections, certain of said connections continuously connecting said heater to said source of power in various circuit arrangements to obtain various fixed heating rates, said connecting means having one circuit connection in which one of the heating sections alone is connected to the source and another connection in which another heating section is connected alone to said source, said manually settable means having at least one other position, means rendered effective when said connecting means is therein for repeatedly alternately connecting and disconnecting a terminal of said heater from said source at a relatively high frequency.

18. An electric surface heating means comprising a surface heater having a plurality of heating sections, a source of electric energy, manually settable multiple-position connecting means having a plurality of selective positions for continuously connecting said heater to said source of power in various circuit arrangements to obtain various constant heating rates, said manually settable means having still another selective position, means rendered effective only when said settable means is in said another position for gradually varying the heat output of said heater over a considerable range whereby deterioration or inefficient operation of said varying means is minimized.

19. An electric surface heating means comprising a surface heater having a plurality of heating sections, a source of electric energy, manually settable multiple-position connecting means having a plurality of selective positions providing connections, certain of said connections continuously connecting said heater to said source of power in various circuit arrangements to obtain various fixed heating rates, said connecting means having one circuit connection in which one of the heating sections alone is connected to the source and another connection in which two heating sections are connected in series to said source, said manually settable means having at least one other position, means rendered effective when said connecting means is therein for gradually varying the heat output of said heater over a considerable range whereby deterioration or inefficient operation of said varying means is minimized.

GEORGE C. PEARCE.

CERTIFICATE OF CORRECTION.

Patent No. 2,329,417.   September 14, 1943.

GEORGE C. PEARCE.

It is hereby certified that error appears in the printed specification of the above numbered patent requiring correction as follows: Page 3, second column, line 18, claim 6, after the word "wires" insert --and--; line 19, strike out "another" and insert instead --the second--; line 22, for "said another" read --and said second--; lines 44 and 63, claims 8 and 9 respectively, before "means" insert --alternately connecting--; line 63, claim 9, for "thrid" read --third--; and that the said Letters Patent should be read with this correction therein that the same may conform to the record of the case in the Patent Office.

Signed and sealed this 2nd day of November, A. D. 1943.

(Seal)

Henry Van Arsdale,
Acting Commissioner of Patents.